United States Patent
Kumakura et al.

(10) Patent No.: US 6,303,712 B1
(45) Date of Patent: Oct. 16, 2001

(54) PROCESS FOR PRODUCING VINYL CHLORIDE POLYMER

(75) Inventors: Kazuhiro Kumakura; Makoto Ooura, both of Hasaki-machi; Tadashi Amano, Kamisu-machi, all of (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/377,917

(22) Filed: Aug. 20, 1999

(30) Foreign Application Priority Data

Aug. 21, 1998 (JP) .................................... 10-251958

(51) Int. Cl.$^7$ ........................................................ C08F 2/18
(52) U.S. Cl. ............................ 526/74; 526/62; 526/227; 526/291
(58) Field of Search ................................ 526/62, 74, 227, 526/291

(56) References Cited

U.S. PATENT DOCUMENTS 4,256,863 * 3/1981 McOnie et al. ...................... 526/62
4,431,783 * 2/1984 Walker et al. ...................... 526/62

* cited by examiner

*Primary Examiner*—David W. Wu
*Assistant Examiner*—William Cheung
(74) *Attorney, Agent, or Firm*—Oblon, Spivak, McClelland, Maier & Neustadt, P.C.

(57) ABSTRACT

In a process for producing a vinyl chloride polymer by suspension polymerization in a polymerization vessel having a coating film of a polymer scale preventive agent on the polymerization vessel inner wall and other inner surfaces, the polymerization is initiated by introducing an oil-soluble polymerization initiator having 10-hour half-life temperature of from 30° C. to 55° C., at a particular position of the interior of the liquid phase of polymerization materials charged. The position satisfys the following expression:

$$H \leq 0.7 H_0$$

wherein H represents a height from the bottom of the polymerization vessel to the position where the polymerization initiator is introduced, and $H_0$ represents a height from the bottom of the polymerization vessel to the liquid surface of the liquid phase. This process can effectively prevent polymer scales from adhering to the polymerization vessel inner wall of course and also to the baffle on its side facing the polymerization vessel inner wall at the gas/liquid interface and the vicinity thereof even with repetition of polymerization of vinyl chloride. Good formed products with less fish eyes can be obtained.

12 Claims, 1 Drawing Sheet

PROCESS FOR PRODUCING VINYL CHLORIDE POLYMER

BACKGROUND OF THE INVENTION

1. Field of the Invention

This invention relates to a process for producing a vinyl chloride polymer by suspension polymerization of vinyl chloride monomers or a monomer mixture containing them.

2. Description of the Prior Art

The suspension polymerization of vinyl chloride monomers or a monomer mixture thereof in an aqueous medium are usually carried out in a polymerization vessel provided with a cooling/heating jacket, a stirrer, a material charging line, a baffle, a polymer draw-out line, an unreacted monomer recovery line and so forth. To polymerize the vinyl chloride monomers or monomer mixture in an aqueous medium in such a polymerization vessel, a process is employed in which the aqueous medium, a dispersant, the vinyl chloride monomers or monomer mixture, a polymerization initiator and optionally other additives are fed through the material charging line, provided at the gas-phase upper part of the polymerization vessel, into the polymerization vessel with stirring and thereafter these are heated to carry out polymerization.

In this polymerization process, polymer scales tend to adhere to the polymerization vessel inner wall, stirrers and so forth. Such polymer scales bring about problems that those having adhered thereto may cause a decrease in cooling capacity of the polymerization vessel, and also those having come off may mix in products, resulting in a low product quality. Much labor and time must be taken to remove such polymer scales having adhered. Also, since the polymer scales contain unreacted monomers, there is a problem of environmental hygiene.

Accordingly, in order to prevent polymer scales from adhering, a polymerization vessel is conventionally used whose inner wall and so forth have been coated with a polymer scale preventive agent to form its coating film.

Use of such a polymerization vessel, however, is still disadvantageous in that, with repetition of polymerization, the polymer scales tend to adhere to the polymerization vessel inner wall and especially to the baffle provided in the polymerization vessel, on its side facing the polymerization vessel inner wall at the interface between gas phase and liquid phase (hereinafter "gas/liquid interface") and the vicinity thereof.

Once polymer scales have adhered to the baffle on its side facing the polymerization vessel inner wall at the gas/liquid interface and the vicinity thereof, the polymer scales grow gradually with repetition of polymerization, and the polymer scales having grown may come off and mix in the resulting polymer to cause fish eyes in a large number, resulting in a poor product quality. Such a problem has been involved.

In recent years, for the purpose of improving productivity, an oil-soluble polymerization initiator has been used whose temperature at which the half-life comes to be 10 hours in the state of a 0.1 mol/L benzene solution is 30 to 55° C., in order to shorten polymerization time (Japanese Laying-open Publication (kokai) Nos. 8-109203 and 8-225613). However, there is another problem that such an oil-soluble polymerization initiator is active at relatively low-temperature and hence the polymerization carried out using the oil-soluble polymerization initiator tends to result in a poor product quality, e.g., to cause fish eyes in a large number in the resulting polymer.

SUMMARY OF THE INVENTION

Accordingly, in a process for producing a vinyl chloride polymer by polymerizing vinyl chloride monomers or a monomer mixture thereof in an aqueous medium, an object of the present invention is to provide a vinyl chloride polymer production process that can effectively prevent polymer scales from adhering to the polymerization vessel inner wall of course and also to the baffle on its side facing the polymerization vessel inner wall at the gas/liquid interface and the vicinity thereof even with repetition of polymerization and may cause less fish eyes in the product polymer obtained.

To achieve the above object, the present invention provides a process for producing a vinyl chloride polymer, comprising subjecting vinyl chloride monomers or a vinyl-chloride-containing monomer mixture to suspension polymerization in the presence of a dispersant and a polymerization initiator in an aqueous medium in a polymerization vessel, wherein a coating film of a polymer scale preventive agent has been formed on the inner wall of the polymerization vessel and other portions with which monomers come into contact during the polymerization;

the polymerization initiator is an oil-soluble polymerization initiator whose temperature at which the half-life comes to be 10 hours in the state of a benzene solution of 0.1 mol/L concentration is 30° C. to 55° C.; and the process comprising the steps of:

charging materials including the vinyl chloride monomers or monomer mixture, the aqueous medium and the dispersant; and initiating the polymerization by introducing the polymerization initiator at a position of the interior of the liquid phase comprising a mixture of the materials charged, the position satisfying the following expression:

$$H \leq 0.7 H_0$$

wherein H represents a height from the bottom of the polymerization vessel to the position where the polymerization initiator is introduced, and $H_0$ represents a height from the bottom of the polymerization vessel to the liquid surface of the liquid phase comprising the mixture of the materials.

DETAILED DESCRIPTION OF THE INVENTION

Figure 1:
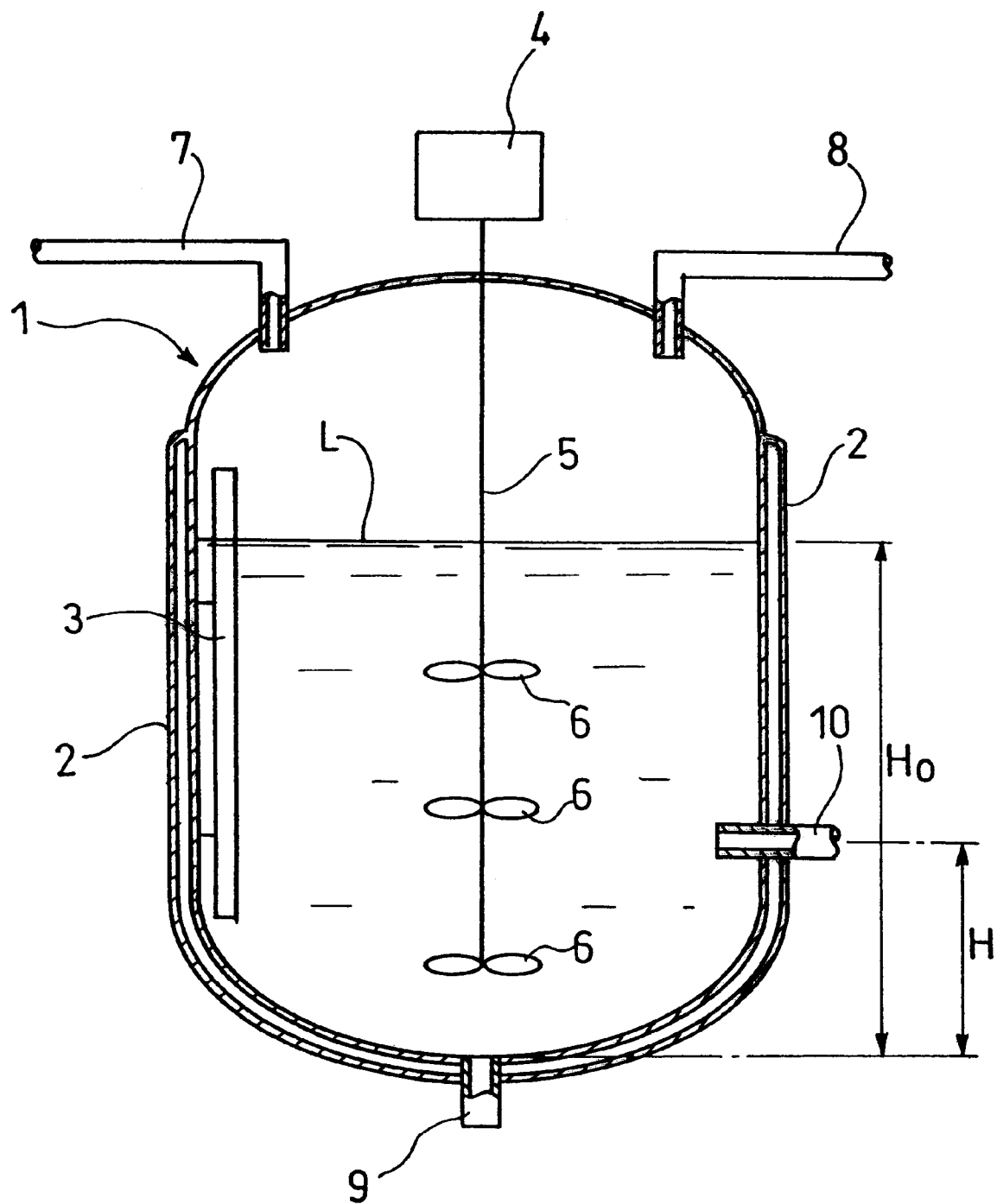
FIG. 1 is a cross-sectional view of a polymerization vessel used in Examples.

The present invention will be described below in detail.

Polymer scale preventive agent:

In the polymerization vessel used in the present invention, a coating film of a polymer scale preventive agent (hereinafter often "scale preventive agent") has been formed on its inner wall and other portions (inclusive of the inner bottom surface) with which monomers come into contact during polymerization. The coating film is formed by coating the scale preventive agent. As the scale preventive agent used here, there are no particular limitations thereon so long as the effect of preventing adhesion of polymer scales can be obtained, and all known agents are usable. Preferred are condensation products of aromatic compounds. Those preferred as the condensation products of aromatic compounds are as exemplified below.

Aldehyde compound/aromatic hydroxyl compound condensation products

The aldehyde compound/aromatic hydroxyl compound condensation product is a condensation product of an aldehyde compound with an aromatic hydroxyl compound. The use of such aldehyde compound/aromatic hydroxyl compound condensation products in scale preventive agents are disclosed in, for example, Japanese Laying-open Publication (kokai) No. 57-192413, Japanese Post-examination Publication (kokoku) No. 6-62709 and Japanese Laying-open Publication (kokai) No. 57-164107.

The aldehyde compounds include, for example, formaldehyde, acetaldehyde, benzaldehyde and furfural.

The aromatic hydroxyl compounds include, for example, dihydroxybiphenyl compounds, naphthol compounds, phenol compounds, tannins and dimeric compounds of 2,3-dihydroxynaphthalene.

Examples of the dihydroxybiphenyl compounds include 2,2'-dihydroxybiphenyl, 2,2'-dihydroxy-5,5'-dimethylbiphenyl, 2,2'-dihydroxy-4,4',5,5'-tetramethylbiphenyl, 2,2'-dihydroxy-5,5'-dichlorobiphenyl, 2,2'-dihydroxy-5,5'-dicyclohexylbiphenyl and 2,2'-dihydroxy-5,5'-di-tert-butylbiphenyl. In particular, from an industrial viewpoint, 2,2'-dihydroxybiphenyl is preferred.

Examples of the naphthol compounds include 1-naphthol, 1,3-dihydroxynaphthalene, 1,5-dihydroxynaphthalene and 1,7-dihydroxynaphthalene.

Examples of the phenol compounds include phenol, cresol, pyrogallol, hydroxyhydroquinone, resorcin, catechol, hydroquinone, bisphenol-A, hydroxybenzoic acid and salicylic acid.

Examples of the tannins include tannic acid, Chinese gallotannin, Turkish gallotannin, sumac tannin, quebracho tannin, and tannin of persimmon (shibuol).

The dimeric compounds of 2,3-dihydroxynaphthalene include, for example, 2,3,2',3'-tetrahydroxybinaphthyl.

The above condensation product of an aldehyde compound with an aromatic hydroxyl compound can be produced by reacting these reactive components in a suitable medium in the presence of a catalyst, usually at room temperature to 200° C. for 2 to 100 hours, preferably at 30 to 150° C. for 3 to 30 hours.

The medium in which the above condensation reaction is carried out includes, for example, water, and organic solvents, such as alcohols, ketones and esters. The organic solvents include, for example, alcohols, such as methanol, ethanol and propanol; ketones, such as acetone and methyl ethyl ketone; and esters, such as methyl acetate and ethyl acetate.

The medium in which the above condensation reaction is carried out has a pH in the range of usually from 1 to 13, and pH adjusters may be used without any particular limitations.

The catalyst used in the above condensation reaction includes, for example, acidic catalysts, such as sulfuric acid, hydrochloric acid, perchloric acid, p-toluenesulfonic acid, methanesulfonic acid and trifluoromethanesulfonic acid; and basic catalysts, such as NaOH, KOH and $NH_4OH$.

The ratio of the aldehyde to the aromatic hydroxyl compound used when the condensation reaction is carried out depends on the types of the aldehyde compound, aromatic hydroxyl compound, solvent and catalyst used, the reaction time, the reaction temperature and so forth. Generally, it is preferable to use from 0.1 to 10 mols of the aldehyde compound per mol of the aromatic hydroxyl compound.

Pyrogallol/acetone condensation products

The pyrogallol/acetone condensation product is a condensation product of pyrogallol with acetone, the molar ratio of the pyrogallol to the acetone being in the range of usually from 1/0.1 to 1/10, and the melting point thereof being usually from 100 to 500° C. The melting point increases with an increase in molecular weights. For example, melting points of from 160 to 170° C. correspond to molecular weights of from 1,450 to 1,650; and melting points of from 200 to 220° C., to molecular weights of from 2,600 to 4,000. The use of such pyrogallol/acetone condensation products in scale preventive agents is disclosed in, for example, Japanese Laying-open Publication (kokai) No. 4-328104.

The pyrogallol/acetone condensation product can be produced by dissolving pyrogallol in acetone, and condensing them in the presence of a condensation catalyst. The pyrogallol is used in an amount of usually from 1 to 100 parts by weight per 100 parts by weight of the acetone. As the condensation catalyst, for example, phosphorus oxychloride is used. The reaction may be carried out at room temperature to 100° C.

Polyhydric phenol self-condensation products and polyhydric naphthol self-condensation products Polyhydric phenols are exemplified by catechol, resorcinol, chlororesorcinol, hydroquinone, phloroglucinol and pyrogallol; dihydroxytoluene and xylene; trihydroxytoluene and trihydroxyxylene; ethyl-di-, propyl-di-, butyl-di- or pentyl-di-hydroxybenzene; and trihydroxybenzene. Polyhydric naphthols are exemplified by naphthol derivatives, such as 1,3-, 1,4-, 1,5- or 1,7-dihydroxynaphthalene. The use of such polyhydric phenol self-condensation products and polyhydric naphthol self-condensation products in scale preventive agents is disclosed in, for example, Japanese Laying-open Publication (kokai) No. 54-7487.

The polyhydric phenol self-condensation product or polyhydric naphthol self-condensation product can be produced by heating polyhydric phenol or polyhydric naphthol in an inert atmosphere, such as nitrogen, argon or the like, at a temperature ranging from 200 to 350° C. for 4 to 100 hours. In this reaction, various catalysts may be used, as exemplified by zinc chloride, aluminum chloride and sodium hydroxide.

Aromatic amine compound condensation products

The aromatic amine compound condensation products include, for example;

(1) a self-condensation product of an aromatic amine compound;
(2) a condensation product of an aromatic amine compound with a phenol compound;
(3) a condensation product of an aromatic amine compound with an aromatic nitro compound; and
(4) a basic product obtained by making basic a condensation product of an aromatic amine compound with an aromatic nitro compound by the use of an alkali metal salt or an ammonium compound.

The use of such aromatic amine compound condensation products is disclosed in, for example, Japanese Post-examination Publication (kokoku) Nos. 59-16561 and 60-30681.

The aromatic amine compounds are exemplified by aniline, o-, m- or p-phenylenediamine, o-, m- or p-aminophenol, o-, m- or p-chloroaniline, p-aminoazobenzene, 2,4-diaminoazobenzene, p-aminoacetanilide, o-, m- or p-methylaniline, 4-aminodiphenylamine, 2-aminodiphenylamine, 4,4- diaminodiphenylamine, N,N-dimethyl-p-phenylenediamine, 4-chloro-o-phenylenediamine, 4-methoxy-o-phenylenediamine, 2-amono-4-chlorophenol, 2,3-diaminotoluene, 2,4-diaminophenol, and diphenylamines such as 4-amino-3'-methoxydiphenylamine and 4-amino-4'-hydroxydiphenylamine.

The phenol compounds are specifically exemplified by phenol, hydroquinone, resorcinol, catechol, hydroxyhydroquinone, pyrogallol, o-, m- orp-chlorophenol, o-, m- or p-hydroxybenzoic acid, 2,4-dihydroxybenzoic acid, 2,5-dihydroxybenzoic acid, 2,6-dihydroxybenzoic acid, 3,4-dihydroxybenzoic acid, 3,5-dihydroxybenzoic acid and 2,5-, 2,6- or 3,5-dihydroxytoluene.

The aromatic nitro compounds are exemplified by nitrobenzene, o-, m- or p-hydroxynitrobenzene, o-, m- or p-nitroanisole, o-, m- or p-nitrophenol, o-, m- or p-chloronitrobenzene, o-, m- or p-aminonitrobenzene, o-, m- or p-nitrobenzoic acid, o-, m- or p-nitrobenzenesulfonic acid, o-, m- or p-nitroaniline, 2-nitro-p-phenylenediamine, 2-amino-4-nitrophenol, 2-amino-5-nitrophenol and 4-amino-2-nitrophenol.

In order to carry out the self-condensation reaction of an aromatic amine compound alone, the condensation reaction of an aromatic amine compound with a phenol compound and the condensation reaction of an aromatic amine compound with an aromatic nitro compound, a mineral acid and a condensation catalyst are used. The mineral acids are exemplified by hydrochloric acid, nitric acid, hydrobromic acid, phosphoric acid and sulfuric acid.

Preferable condensation catalysts are exemplified by permanganic acid and salts thereof, such as permanganic acid and potassium permanganate; chromic acid-related compounds, such as chromium trioxide, potassium dichromate and sodium chlorochromate; metal nitrates, such as silver nitrate and lead nitrate; halogens, such as iodine and bromine; peroxides, such as hydrogen peroxide, sodium peroxide, benzoyl peroxide, potassium persulfate, ammonium persulfate, peracetic acid, cumene hydroperoxide, perbenzoic acid and p-menthane hydroperoxide; oxygen acids or oxygen acid salts, such as iodic acid, potassium iodate and sodium chlorate; metal salts, such as ferrous chloride, ferric chloride, copper sulfate, cuprous chloride, cupric chloride and lead acetate; ozone; and oxides, such as copper oxide, mercury oxide, cerium oxide, manganese dioxide and osmic acid. It is also effective to use hydrogen peroxide and ferrous chloride in combination.

The self-condensation reaction of an aromatic amine compound alone, the condensation reaction of an aromatic amine compound with a phenol compound and the condensation reaction of an aromatic amine compound with an aromatic nitro compound may be carried out in the presence of a condensation catalyst at 100 to 350° C. for 2 to 100 hours.

The ratio of an aromatic amine compound to a phenol compound or an aromatic nitro compound, which are used in the condensation reaction of an aromatic amine compound with a phenol compound and the condensation reaction of an aromatic amine compound with an aromatic nitro compound, depends on the types of the aromatic amine compounds, phenol compounds and aromatic nitro compounds and catalysts used, the reaction time, the reaction temperature and so forth. Generally, it is preferable to use from 0.1 to 10 mols of the phenol compound or the aromatic nitro compound per mol of the aromatic amine compound.

In order to make basic a condensation product of an aromatic amine compound with an aromatic nitro compound by the use of an alkali metal salt or an ammonium compound, for example, 100 parts by weight of the condensation product of an aromatic amine compound with an aromatic nitro compound is dispersed in water, 10 to 20 parts by weight of an alkaline or ammonium compound, such as NaOH, KOH, $Na_2CO_3$, $NH_4OH$ or $(NH_4)_2CO_3$ is added thereto, and the mixture obtained is heat treated at 90 to 140° C. The alkali or ammonium compound may be used in an amount sufficient to neutralize the mineral acid used at the time of the condensation reaction.

Quinone compound condensation products

The quinone compound condensation products include, for example, ① a self-condensation product of (a) a quinone compound, and ② condensation product of (a) a quinone compound with (b) at least one compound selected from the group consisting of an aromatic hydroxyl compound and an aromatic amine compound. The use of such quinone compound condensation products or polyhydric naphthol self-condensation products in scale preventive agents is disclosed in, for example, Japanese Laying-open Publication (kokai) Nos. 5-112603 and 6-56911.

The quinone compounds (a) include, for example, benzoquinones and derivatives thereof, such as o-, m- or p-benzoquinone, tolu-p-quinone, o-xylo-p-quinone, thymoquinone, 2-methoxybenzoquinone, gentisyl quinone, polyporic acid and ubiquinone; naphthoquinones and derivatives thereof, such as 6-methyl-1,4-naphthoquinone, 2-methyl-1,4-naphthoquinone, α-naphthoquinone, juglone, lawsone, plumbagin, alkannin, echinochrome A, Vitamin $K_1$, Vitamin $K_2$, shikonin, β,β'-dimethyl acrylshikonin, β-hydroxyisovaleroshikonin and teracrylshikonin; anthraquinones and derivatives thereof, such as tectoquinone, 3-hydroxy-2-methylanthraquinone, anthraquinone, 2-hydroxyanthraquinone, alizarin, xanthopurpurin, rubiadin, munjistin, crysophanic acid, carminic acid, kermesic acid and laccaic acid A; and phenanthrenequinones such as phenanthrenequinone.

The aromatic amine compounds used as the reaction (b) are specifically exemplified by aniline, o-, m- or p-phenylenediamine, o-, m- or p-chloroaniline, o-, m- or p-methylaniline, N,N-dimethyl-p-phenylenediamine, 4-chloro-o-phenylenediamine, 4-methoxy-o-phenylenediamine, 2-amino-4-chlorophenol, 2,3-diaminotoluene, 4-amino-2-aminophenol, o-, m- or p-aminophenol, o-, m- or p-aminobenzoic acid, 2,3-, 2,4-, 2,5-, 2,6-, 3,4-, 3,5- or 4,6-diaminobenzoic acid, 3- or 4-aminophthalic acid, 2-, 4- or 5-aminoisophthalic acid, 4,6-diaminoisophthalic acid, 2,5- or 2,6-diaminoterephthalic acid, 3-, 4- or 5-aminosalicylic acid, 4-hydroxyanthranilic acid, o-, m- or p-aminobenzenesulfonic acid, 2,3-, 2,4-, 2,5-, 2,6-, 3,4- or 3,5-diaminobenzenesulfonic acid, 2-amino-1-phenol-4-sulfonic acid and 6-amino-4-chloro-1-phenol-2-sulfonic acid, α-naphthylamine, β-naphthylamine, 1,5-diaminonaphthalene, 1-amino-5-hydroxynaphthalene, 1,8-diaminonaphthalene, 2,3-diminonaphthalene, 4-amino-1-naphthol, 1-amino-5-naphthol, 1,2-naphthylenediamine-7-carboxylic acid, 1,5-naphthylenediamine-2-carboxylic acid, 1,5-naphthylenediamine-4-carboxylic acid, 1,6-naphthylenediamine-4-carboxylic acid, 1,8-naphthylenediamine-4-carboxylic acid, 1,2-naphthylenediamine-3-sulfonic acid, 1,2-naphthylenediamine-4-sulfonic acid, 1,2-naphthylenediamine-5-sulfonic acid, 1,2-naphthylenediamine-6-sulfonic acid, 1,2-naphthylenediamine-7-sulfonic acid, 1,3-naphthylenediamine-5-sulfonic acid, 1,3-naphthylenediamine-6-sulfonic acid, 1,4-naphthylenediamine-2-sulfonic acid, 1,4- naphthylenediamine-7-sulfonic acid, 1,5-naphthylenediamine-2-sulfonic acid, 1,5-naphthylenediamine-4-sulfonic acid, 1,5-naphthylenediamine-7-sulfonic acid, 1,6-naphthylenediamine-2-sulfonic acid, 1,6-naphthylenediamine-4-sulfonic acid, 1,6-naphthylenediamine-7-sulfonic acid, 1,8-naphthylenediamine-4-sulfonic acid, 1,8-naphthylenediamine-3,6-disulfonic acid, 1,8-naphthylenediamine-4,5-disulfonic acid, α-amino-β-naphthalenepropionic acid, α-amino-β-naphthalenecarboxylic acid, 2-naphthylamine-1-sulfonic acid, 8-naphthylamine-1-sulfonic acid, 5-naphthylamine-1-sulfonic acid, 1-amino-2-naphthol-4-sulfonic acid, 2-amino-8-naphthol-6-sulfonic acid (γ-acid), 2-amino-5-naphthol-7-sulfonic acid (J-acid) and 1-amino-8-naphthol-3,6-disulfonic acid (H-acid), and diphenylamines, such as 4-aminodiphenylamine-, 2-aminodiphenylamine, 4,4'-diaminodiphenylamine-, 4-amino-3'-methoxydiphenylamine, 4-amino-4'-hydroxydiphenylamine, 4-hydroxydiphenylamine, 4-carboxydiphenylamine, 4-amino-4'-carboxydiphenylamine, 4-sulfodiphenylamine and 4-amino-4'-sulfodiphenylamine.

The aromatic hydroxyl compounds used as the reaction (b) are exemplified by phenols and derivatives thereof, such as phenol, hydroquinone, resorcinol, catechol, hydroxyhydroquinone, pyrogallol, o-, m- orp-chlorophenol, o-, m- or p-hydroxybenzoic acid, 2,4-dihydroxybenzoic acid, 2,5-dihydroxybenzoic acid, 2,6-dihydroxybenzoic acid, 3,4-dihydroxybenzoic acid, 3,5-dihydroxybenzoic acid and 2,5-, 2,6- or 3,5-dihydroxytoluene.

In addition, they are exemplified by naphthols and derivatives thereof, such as α-naphthol, β-naphthol, 1,3-, 1,4-, 1,5-, 2,3-, 2,6- or 2,7-dihydroxynaphthalene, 1-hydroxy-2-naphthoic acid and 3-hydroxy-2-naphthoic acid.

The self-condensation of a quinone compound (a) or the condensation of a quinone compound (a) with an aromatic hydroxyl compound and/or an aromatic amine compound (b) is carried out in an organic solvent medium, optionally in the presence of a condensation catalyst. The organic solvent medium has a pH within the range of from 1 to 13, preferably from 4 to 10, and pH adjusters may be used without any particular limitations. The pH adjusters used include acidic compounds, for example, phosphoric acid, sulfuric acid, phytic acid and acetic acid; and alkali compounds, for example, alkaline metal compounds or ammonium compounds, such as LiOH, KOH, NaOH, $Na_2CO_3$, $Na_2SiO_3$, $Na_2HPO_4$ and $NH_4OH$; and organic amine compounds, such as ethylenediamine, monoethanolamine and triethanolamine.

As the medium for the condensation reaction, organic solvents as exemplified by alcohols, ketones and esters, or mixed solvents of water and organic solvents miscible with water are preferred. Usable organic solvents miscible with water include, for example, alcohols, such as methanol, ethanol and propanol; ketones, such as acetone and methyl ethyl ketone; and esters, such as methyl acetate and ethyl acetate.

The condensation catalyst may be optionally used which is exemplified by azo catalysts such as α,α'-azobisisobutylonitrile and α,α'-azobis-2,4-dimethylvaleronitrile; elementary or molecular single halogens, such as iodine, bromine and chlorine; peroxides, such as hydrogen peroxide, sodium peroxide, benzoyl peroxide, potassium persulfate, ammonium persulfate, peracetic acid, cumene hydroperoxide, perbenzoic acid and p-menthane hydroperoxide; oxygen acids or oxygen acid salts, such as iodic acid, periodic acid, potassium periodate and sodium perchlorate. Incidentally, since the quinone compound acts as a condensation catalyst, the condensation reaction takes place even in the absence of a condensation catalyst.

The condensation reaction may be generally carried out at room temperature to 200° C. for 0.5 to 100 hours.

When (a) a quinone compound and (b) an aromatic hydroxyl compound and/or an aromatic amine compound are condensed, the proportion of both reactive components used depends on the types and composition of the aromatic amine compounds, quinone compounds and aromatic hydroxyl compounds, the reaction temperature and the reaction time. It is preferable to use from 0.01 to 10.0 mols of the component (b) per mol of the component (a).

The above scale preventive agent is dissolved in a suitable solvent to prepare a coating solution. The solvent may include, e.g., water; alcohol type solvents such as methanol, ethanol, propanol, butanol, 2-butanol, 2-methyl-1-propanol, 2-methyl-2-propanol, 3-methyl-1-butanol, 2-methyl-2-butanol and 2-pentanol; ketone type solvents such as acetone, methyl ethyl ketone and methyl isobutyl ketone; ester type solvents such as methyl formate, ethyl formate, methyl acetate, ethyl acetate and methyl acetoacetate; ether type solvents such as 4-methyldioxolane and ethylene glycol diethyl ether; furans; and non-protonic solvents such as dimethylformamide, dimethyl sulfoxide and acetonitrile. Any of these may appropriately used alone or in the form of a mixed solvent of two or more. In the coating solution used when the scale preventive agent is coated, the scale preventive agent may be in a concentration ranging from 0.005 to 25.0% by weight.

The scale preventive agent may preferably be coated not only on the polymerization vessel inner wall surface but also on polymerization vessel attachments at their portions to which the polymer scales may likely adhere, i.e., portions with which monomers come into contact in the course of polymerization (which include any portions with which monomers may come into contact), to form the coating film. The polymerization vessel attachment portions with which monomers come into contact are, e.g., inner bottom surface, stirring blades, a stirrer shaft, a capacitor, a header, a baffle, surge coils, bolts and nuts. There are no particular limitations on the manner of coating the scale preventive agent on the polymerization vessel inner wall surface and others. For example, coating such as $N_2$ gas pressure coating, monomer gas pressure coating and low-pressure steam spraying may be used which are disclosed in Japanese Pre-examination Patent Publications (kokai) Nos. 57-61001 and 55-36288, Japanese Post-examination Publications (kokoku) Nos. 56-501116 and 56-501117 and Japanese Pre-examination Patent Publication (kokai) No. 59-11303.

Materials:

In the process of the present invention, materials such as vinyl chloride monomers, an aqueous medium and a dispersant are charged into the polymerization vessel where the coating film of the scale preventive agent has been thus formed on the polymerization vessel inner wall surface and other portions with which monomers come into contact.

As the vinyl chloride monomers, the vinyl chloride monomer may be used alone. Also usable is a monomer mixture containing vinyl chloride monomers chiefly and comonomers copolymerizable with the vinyl chloride monomers (which usually contains at least 50% by weight of vinyl chloride). Such comonomers may be exemplified by vinyl esters such as vinyl acetate and vinyl propionate, (meth)

acrylic esters such as methyl acrylate and ethyl acrylate, olefins such as ethylene and propylene, maleic anhydride, acrylonitrile, styrene, and vinylidene chloride.

As the aqueous medium, usable are deionized water and distilled water. It is suitable for the aqueous medium to be used in an amount ranging from 80 to 200 parts by weight based on 100 parts by weight of the monomer. As the dispersant, those conventionally used in suspension polymerization of vinyl chloride monomers in aqueous mediums may be used, as exemplified by water-soluble partially saponified polyvinyl alcohol; water-soluble cellulose ethers such as methyl cellulose, ethyl cellulose, hydroxyethyl cellulose, hydroxypropyl cellulose and hydroxypropylmethyl cellulose; and water-soluble polymers such as polyacrylic acid and gelatin; any of which are used in a small quantity within the range the object of the present invention is not damaged. Stated specifically, it is suitable for such a dispersant to be used in an amount ranging from 0.03 to 3 parts by weight based on 100 parts by weight of the monomer.

Oil-soluble polymerization initiator:

In the present invention, an oil-soluble polymerization initiator whose temperature at which the half-life comes to be 10 hours in the state of a benzene solution of 0.1 mol/L concentration (hereinafter "10-hour half-life temperature") is 30° C. to 55° C.

As specific examples of such an oil-soluble polymerization initiator, it may include the following. The 10-hour half-life temperature is shown in parentheses.

What can be exemplified are perester compounds such as t-hexyl peroxyneodecanoate (44.7° C.), t-butyl peroxyneodecanoate (46.5° C.), t-hexyl peroxyneohexanoate (49.7° C.), t-butyl peroxyneohexanoate (52.1° C.), t-butyl peroxyneoheptanoate (50.0° C.), t-hexyl peroxypivarate (53.2° C.), α-cumyl peroxyneodecanoate (36.6° C.), 2,4,4-trimethylpentyl peroxy-2-neodecanoate (40° C.) 1,1-dimethyl-3-hydroxybutyl peroxyneodecanoate (37° C.), 1-cyclohexyl-1-methyethyl peroxyneodecanoate (41.4° C.) and t-hexyl peroxyneodecanoate (44.7° C.); diacyl compounds such as isobutyryl peroxide (33° C.); and percarbonate compounds such as diisopropyl peroxydicarbonate (41° C.), di-n-propyl peroxydicarbonate (41° C.), di-myristyl peroxydicarbonate (41° C.) and di-2-ethylhexyl peroxydicarbonate (43.5° C.). Any of these polymerization initiators exemplified here may be used alone or in combination of two or more.

The polymerization initiator used in the present invention is as exemplified above. Perester compounds, diacyl compounds and percarbonate compounds are preferred.

As the polymerization initiator used in the present invention, the oil-soluble polymerization initiator having a 10-hour half-life temperature of from 30 to 55° C., and preferably from 30 to 50° C., is used. Use of a polymerization initiator having a 10-hour half-life temperature below 30° C. may cause fish eyes of the resulting polymer in a large number or may cause a decrease in continuous activity of the initiator. Those above 50° C. make it necessary to use the polymerization initiator in a large quantity. Thus, in either case, the resulting polymer may have poor quality characteristics such as poor initial coloring and poor anti-leaching.

In the present invention, the resulting polymer can more effectively be made to have less fish eyes when an oil-soluble polymerization initiator having a 10-hour half-life temperature of from 30° C. to 40° C. and an oil-soluble polymerization initiator having a 10-hour half-life temperature of above 40° C. to 55° C., and preferably above 40° C. to 50° C., are used in combination. In such a case, the oil-soluble polymerization initiator having a 10-hour half-life temperature of from 30° C. to 40° C. and the oil-soluble polymerization initiator having a 10-hour half-life temperature of above 40° C. to 55° C. may be used in a proportion ranging from 1:1 to 1:30, and preferably from 1:3 to 1:15, in weight ratio.

The polymerization initiator may be added as it is, but may preferably be added in the form of a solution prepared by dissolving it in an organic solvent or in the form of a dispersion prepared by dispersing it in water. In the case of the dispersion, the polymerization initiator may merely be disperse in water, or the polymerization initiator may be dispersed in water by the aid of an emulsifying agent and a suspending agent.

In the case when the polymerization initiator is added in the form of the solution, the organic solvent may include alcohols such as methanol and ethanol; aliphatic hydrocarbons such as hexane, and mixtures thereof (commercially available products are exemplified by SHELL SOL (trade name; available from Shell Chemical Co.); and aromatic hydrocarbons such as benzene, toluene and xylene.

In the case when the polymerization initiator is added in the form of the dispersion prepared by dispersing the polymerization initiator by the aid of an emulsifying agent and a suspending agent, any of anionic type, ampholytic type, cationic type and nonionic type may be used as the emulsifying agent. In particular, in the suspension polymerization of vinyl chloride, nonionic emulsifying agent are preferred, as exemplified by fatty acid partial esters of polyhydric alcohols, such as glycerol monostearate, sorbitan monolaurate and sorbitan monooleate; polyoxyethyl esters of fatty acids or aromatic hydroxyl compounds; and condensation products of polyethylene oxides with polypropylene oxides. Any of these emulsifying agents may be used alone or in combination of two or more. The suspending agent used together with the emulsifying agent may include polyvinyl alcohols such as water-soluble partially saponified polyvinyl alcohol; cellulose derivatives (or water-soluble cellulose ethers) such as methyl cellulose, ethyl cellulose, hydroxyethyl cellulose, hydroxypropyl cellulose and hydroxypropylmethyl cellulose; and water-soluble polymers such as maleic anhydride-styrene copolymer, maleic anhydride-methyl vinyl ether copolymer, gelatin, and polyvinyl pyrrolidone.

As the water for the dispersion, part of the water charged as the aqueous medium may be used. Similarly, in the case when the emulsifying agent and/or suspending agent is/are the same as the dispersant used in the polymerization system, part of the dispersant may be used as the emulsifying agent and/or suspending agent for preparing the dispersion.

In either dispersion, an alcohol such as methanol or ethanol or a glycol such as ethylene glycol may be added in order to prevent freezing.

Of the above forms in which the polymerization initiator is used, the dispersion prepared by merely dispersing it in water is preferred because it is ready to handle and is less causative of problems in the medium and so forth present together.

In the case when the polymerization initiator is added in the form of the solution prepared by dissolving it in an organic solvent or in the form of the dispersion prepared by dispersing it in water, the polymerization initiator may be in a concentration of from 30 to 90% by weight, and preferably from 40 to 80% by weight.

It is suitable for the polymerization initiator to be added in an amount ranging from 0.01 to 3 parts by weight based on 100 parts by weight of the monomer.

Polymerization initiator introducing position:

In the present invention, the polymerization initiator is introduced at a specific position in the liquid phase of the mixture of materials charged. That is, the polymerization is initiated by introducing the polymerization initiator at a position of the interior of the liquid phase comprising a mixture of the materials charged, the position satisfying the following expression:

$$H \leq 0.7H_0$$

wherein H represents a height from the bottom of the polymerization vessel to the position where the polymerization initiator is introduced, and $H_0$ represents a height from the bottom of the polymerization vessel to the liquid surface of the liquid phase comprising the mixture of the materials. More specifically, the polymerization initiator introducing position is a position lower by 0.7 time or less the height $H_0$ from the bottom of the polymerization vessel to the liquid surface of the mixture of materials charged. In particular, the height H from the bottom of the polymerization vessel may preferably be in the range of from $0.2_0$ to $0.7H_0$.

Even in the liquid phase, the introduction of the polymerization initiator at a position higher than $0.7H_0$ can not bring about the polymer scale preventive effect of the present invention.

In the present invention, the polymerization temperature at the time and after the polymerization initiator is introduced may be set at 35 to 70° C., which is in the range conventioally employed. Also, other additives such as a polymerization degree modifier, a pH adjuster and a polymerization inhibitor may optionally be added in the polymerization system.

EXAMPLES

Preparation of Scale Preventive Agent Coating Solution

Production of condensation product:

With reference to Production Example 3 disclosed in Japanese Post-examination Publication (kokoku) No. 6-62709, a polymer scale preventive agent was produced.

Into a pressure-resistant reaction vessel, 30 mols (5.59 kg) of 2,2'-dihydroxybiphenyl, 22.5 mols (0.711 kg) of paraformaldehyde with a purity of 95%, 0.19 kg of para-toluenesulfonic acid and 10 liters of ethylene glycol dimethyl ether were charged, and the temperature was raised to 130° C. with stirring. After the reaction was carried out at 130° C. for 17 hours, the reaction mixture was cooled to 50° C. and then put into 50 liters of water. The resin separated by putting the reaction mixture into water was filtered off and then washed with water, followed by drying to obtain 5.1 kg of a 2,2'-dihydroxybiphenyl-formaldehyde condensation product. The 2,2'-dihydroxybiphenyl-formaldehyde condensation product thus obtained was dissolved in methanol, thus a 0.5% by weight methanol solution of the 2,2'-dihydroxybiphenyl-formaldehyde condensation product was prepared, which was used as a scale preventive agent coating solution.

Example 1

A polymerization vessel used in the present Example is shown in FIG. 1. This polymerization vessel, denoted by reference numeral 1, is a 2 m³ inner volume polymerization vessel having a cylindrical internal space. The polymerization vessel 1 is equipped, at its center, with a stirrer consisting of a drive motor 4, a stirrer shaft 5 and stirring blades 6. The polymerization vessel 1 is also equipped, on its outside, with a cooling/heating jacket 2 as a cooling/heating means, and is still also equipped with a baffle 3 along the polymerization vessel inner wall. The polymerization vessel 1 is also equipped with a material charging line 7, an unreacted monomer recovery line 8, a polymer slurry draw-out line 9 and a polymerization initiator feed line 10 which each extend through the vessel from the outside to the inside.

The above coating solution was coated on the polymerization vessel 1 inner wall, inner bottom surface, stirrer shaft 5, stirring blades 6 and other portions with which monomers come into contact during polymerization, and the wet coating formed was dried by heating at 40° C. for 15 minutes to form a coating film, followed by water washing. Thereafter, into the polymerization vessel where the coating film was thus formed, 920 kg of deionized water, 240 g of water-soluble partially saponified polyvinyl alcohol and 92 g of hydroxypropylmethyl cellulose were introduced in the form of an aqueous solution through the line 7, and the inside of the polymerization vessel was evacuated to 50 mmHg, and thereafter 620 kg of vinyl chloride monomers were charged through the line 7. Here, the height $H_0$ of the liquid surface of a mixture of materials thus charged was 1.9 m from the bottom of the polymerization vessel.

Next, 530 g of a 70% by weight toluene solution of a polymerization initiator di-2-ethylhexyl peroxydicarbonate (10-hour half-life temperature: 43.5° C.) was introduced through the line 10 while stirring the mixture of materials charged. Here, the position H where the polymerization initiator was introduced was 0.9 m in height from the bottom of the polymerization vessel. At the same time this polymerization initiator was introduced, hot water was passed through the jacket 2 to raise temperature, and the polymerization was initiated. After the internal temperature reached 57° C. (polymerization preset temperature), the polymerization was continued while maintaining the internal temperature at 57° C. by passing cooling water through the jacket 2. At the time the internal pressure of the polymerization vessel reached 6.5 kg/cm²G, the polymerization was stopped. After the polymerization was completed, unreacted monomers were recovered through the line 8, and also the polymer in the form of a slurry was drawn out of the polymerization vessel through the line 9. Thereafter, the inside of the polymerization vessel 1 was washed with water.

This polymerization, starting with the coating of coating solution inside the polymerization vessel and ending with the water washing after the polymerization was completed, was repeatedly operated 20 times. After water washing after the 20th-time polymerization run was completed, the state of scales adhering to the polymerization vessel inner wall and to the baffle on its side facing the polymerization vessel inner wall at the gas/liquid interface and the vicinity thereof was visually observed. As a result, scales were found to have adhered but very slightly. The polymer slurry drawn out and obtained after the 20th-time polymerization run was completed was dehydrated and dried to obtain a vinyl chloride polymer. Plasticizer take-up and fish eyes of the polymer obtained were measured by the method described later.

Results obtained are shown in Table 1.

Comparative Example 1

The polymerization was repeatedly operated 20 times in the same manner as in Example 1 except that the polymerization initiator was introduced not through the line 10 but through the line 7. After water washing after the 20th-time polymerization run was completed, the state of scales adhering to the polymerization vessel inner wall and to the baffle on its side facing the polymerization vessel inner wall was visually observed. As a result, scales were found to have greatly adhered at the height corresponding to the gas/liquid interface.

The polymer slurry drawn out and obtained after the 20th-time polymerization was completed was dehydrated and dried to obtain a vinyl chloride polymer. Plasticizer take-up and fish eyes of the polymer obtained were measured by the method described later.

Results obtained are shown in Table 1.

Example 2

The polymerization was repeatedly operated 20 times in the same manner as in Example 1 except that as the polymerization initiator the di-2-ethylhexyl peroxydicarbonate was replaced with a mixed solution of 355 g of a 70% by weight isoparaffin solution of t-butyl peroxyneodecanoate (10-hour half-life temperature: 46.5° C.) and 177 g of a 70% by weight isoparaffin solution of a-cumyl peroxyneodecanoate (10-hour half-life temperature: 36.6° C.).

After water washing after the 20th-time polymerization run was completed, the state of scales adhering to the polymerization vessel inner wall and to the baffle on its side facing the polymerization vessel inner wall at the gas/liquid interface and the vicinity thereof was visually observed. As a result, scales were found to have adhered but very slightly. The polymer slurry drawn out and obtained after the 20th-time polymerization was completed was dehydrated and dried to obtain a vinyl chloride polymer. Plasticizer take-up and fish eyes of the polymer obtained were measured by the method described later.

Results obtained are shown in Table 1.

Comparative Example 2

The polymerization was repeatedly operated 20 times in the same manner as in Example 2 except that the polymerization initiator was introduced not through the line 10 but through the line 7. After water washing after the 20th-time polymerization run was completed, the state of scales adhering to the polymerization vessel inner wall and to the baffle on its side facing the polymerization vessel inner wall was visually observed. As a result, scales were found to have greatly adhered at the height corresponding to the gas/liquid interface.

The polymer slurry drawn out and obtained after the 20th-time polymerization was completed was dehydrated and dried to obtain a vinyl chloride polymer. Plasticizer take-up and fish eyes of the polymer obtained were measured by the method described below.

Results obtained are shown in Table 1.

Measurement of plasticizer take-up 400 g of the polymer was introduced into Brabender Plastograph whose jacket temperature was adjusted to 80° C., provided with a stirrer, and preheated for 4 minutes with stirring, followed by addition of 200 g of dioctyl phthalate (DOP), where the time until the DOP was completely absorbed and the stirred product was dried to solidify was measured.

Measurement of fish eyes 100 parts of the vinyl chloride polymer obtained, 50 parts of DOP, 0.1 part of barium stearate, 0.1 part of cadmium stearate, 0.8 part of cetyl alcohol, 2.0 parts of a tin type stabilizer, 0.5 part of titanium dioxide and 0.1 part of carbon black were kneaded together for 5 minutes by means of a six-inch roll kept at 140° C., and the kneaded product was batched off as a sheet of 0.33 mm thick. Fish eyes were indicated as the number of white transparent particles (fish eyes) in the area of 100 $cm^2$ of this sheet. Here, "part(s)" refers to "part(s) by weight".

TABLE 1

|  | Example 1 | Example 2 | Comparative Example 1 | Comparative Example 2 |
|---|---|---|---|---|
| Polymerization initiator: | | | | |
| di-2-ethylhexyl peroxydicarbonate (43.5° C.)*2 | 0.06*1 | — | 0.06*1 | — |
| t-butyl peroxyneodecanoate (46.5° C.) | — | 0.04*1 | — | 0.04*1 |
| α-cumyl peroxyneodecanoate (36.6° C.) | — | 0.02*1 | — | 0.02*1 |
| Manner of charging polymerization initiator: | Injected internally through the liquid phase | Injected internally through the liquid phase | Injected externally from the upper part of the gas phase | Injected externally from the upper part of the gas phase |
| Results of measurement: | | | | |
| Fish eyes | 20 | 25 | 65 | 90 |
| Plasticizer take-up (min.) | 14.5 | 14.4 | 15.1 | 15.5 |

*1: Amount of polymerization initiator added; proportion to vinyl chloride monomers.
*2: The 10-hour half-life temperature is shown in parentheses.

As described above, according to the present invention, the polymer scales can be prevented from adhering to the polymerization vessel inner wall of course and also to the baffle on its side facing the polymerization vessel inner wall at the gas/liquid interface and the vicinity thereof, the latter having been difficult to prevent, even when suspension polymerization of vinyl chloride or a monomer mixture containing vinyl chloride is repeatedly carried out in an aqueous medium in the polymerization vessel. Also, the resulting vinyl chloride polymer has a good plasticizer take-up and has less fish eyes when formed into sheet or the like.

What is claimed is:

1. A process for producing a vinyl chloride polymer, comprising subjecting vinyl chloride monomers or a vinyl-chloride-containing monomer mixture to suspension polymerization in the presence of a dispersant and a polymerization initiator in an aqueous medium in a polymerization vessel, wherein a coating film of a polymer scale preventive agent has been formed on the inner wall of said polymerization vessel and other portions with which monomers come into contact during the polymerization:

said polymerization initiator is an oil-soluble polymerization initiator whose temperature at which the half-life comes to be 10 hours in the state of a benzene solution of 0.1 mol/L concentration is 30° C. to 55° C.; and said process comprising the steps of:

charging materials including the vinyl chloride monomers or monomer mixture, the aqueous medium and the dispersant; and initiating the polymerization by introducing the polymerization initiator at a position of the interior of the liquid phase comprising a mixture of the materials charged, the position satisfying the following expression:

$$H \leq 0.7H_0$$

wherein H represents a height from the bottom of the polymerization vessel to the position where the polymerization initiator is introduced, and Ho represents a height from the bottom of the polymerization vessel to the liquid surface of the liquid phase comprising the mixture of the materials.

2. The process of claim 1, wherein the height H where the polymerization initiator is introduced satisfies $0.2H_0 \leq H \leq 0.7H_0$.

3. The process of claim 1, wherein said polymerization initiator is an oil-soluble polymerization initiator having a 10-hour half-life temperature of from 30° C. to 50° C.

4. The process of claim 1, wherein said polymerization initiator is selected from the group consisting of t-hexyl peroxyneodecanoate, t-butyl peroxyneodecanoate, t-hexyl peroxyneohexanoate, t-butyl peroxyneohexanoate, t-butyl peroxyneoheptanoate, t-hexyl peroxypivarate, α-cumyl peroxyneodecanoate, 2,4,4-trimethylpentyl peroxy-2-neodecanoate, 1,1-dimethyl-3-hydroxybutyl peroxyneodecanoate, 1-cyclohexyl-1-methyethyl peroxyneodecanoate, t-hexyl peroxyneodecanoate, isobutyryl peroxide, diisopropyl peroxydicarbonate, di-n-propyl peroxydicarbonate, di-myristyl peroxydicarbonate and di-2-ethylhexyl peroxydicarbonate.

5. The process of claim 1, wherein said polymerization initiator is a combination of an oil-soluble polymerization initiator having a 10-hour half-life temperature of from 30° C. to 40° C. and an oil-soluble polymerization initiator having a 10-hour half-life temperature of above 40° C. to 55° C.

6. The process of claim 5, wherein said oil-soluble polymerization initiator having a 10-hour half-life temperature of from 30° C. to 40° C. and said oil-soluble polymerization initiator having a 10-hour half-life temperature of above 40° C. to 55° C. are in a proportion within the range of from 1:1 to 1:30 in weight ratio.

7. The process of claim 1, wherein said polymerization initiator is introduced into the liquid phase in the form of a solution prepared by dissolving it in an organic solvent or in the form of a dispersion prepared by dispersing it in water.

8. The process of claim 1, wherein said scale preventive agent is a condensation product of an aromatic compound.

9. The process of claim 8, wherein said condensation product of an aromatic compound is selected from the group consisting of an aldehyde compound/aromatic hydroxyl compound condensation product, a pyrogallol/acetone condensation product, a polyhydric phenol self-condensation product, a polyhydric naphthol self-condensation product and an aromatic amine compound condensation product.

10. The process of claim 1, wherein said vinyl chloride monomers are polymerized.

11. The process of claim 1, wherein vinyl chloride monomers and comonomers selected from the group consisting of a vinyl ester, a (meth)acrylate, an olefin, maleic anhydride, acrylonitrile, styrene and vinylidene chloride are polymerized.

12. The process of claim 1, wherein a monomer mixture of vinyl chloride monomers and comonomers selected from the group consisting of vinyl acetate, vinyl propionate, methyl acrylate, ethyl acrylate, ethylene, propylene, maleic anhydride, acrylonitrile, styrene and vinylidene chloride is polymerized.

* * * * *